(12) United States Patent
Lokhandwala et al.

(10) Patent No.: US 6,592,749 B1
(45) Date of Patent: *Jul. 15, 2003

(54) HYDROGEN/HYDROCARBON SEPARATION PROCESS, INCLUDING PSA AND MEMBRANES

(75) Inventors: Kaaeid A. Lokhandwala, Union City, CA (US); Richard W. Baker, Palo Alto, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 09/718,999

(22) Filed: Nov. 22, 2000

Related U.S. Application Data

(63) Continuation-in-part of application No. 09/316,498, filed on May 21, 1999, now Pat. No. 6,183,628, which is a continuation-in-part of application No. 09/273,207, filed on Mar. 19, 1999, now Pat. No. 6,350,371.

(51) Int. Cl.$^7$ .............................. C07C 7/144; C07C 7/12
(52) U.S. Cl. ...................... 208/102; 208/100; 208/103; 585/802; 585/818; 585/820
(58) Field of Search ............................... 208/100, 102, 208/103; 585/802, 818, 820

(56) References Cited

U.S. PATENT DOCUMENTS

| | | | |
|---|---|---|---|
| 4,229,188 A | 10/1980 | Intille ............................ 55/16 |
| 4,238,204 A | 12/1980 | Perry ............................. 55/16 |
| 4,362,613 A | 12/1982 | MacLean ..................... 208/108 |
| 4,367,135 A | 1/1983 | Posey, Jr. ..................... 208/108 |
| 4,398,926 A | 8/1983 | Doshi ............................ 55/16 |
| 4,548,619 A | 10/1985 | Steacy ........................... 55/16 |
| 4,645,516 A | * 2/1987 | Doshi ............................ 95/51 |
| 4,654,063 A | 3/1987 | Auvil et al. .................... 62/18 |
| 4,690,695 A | 9/1987 | Doshi ............................ 55/16 |
| 4,701,187 A | 10/1987 | Choe et al. ..................... 55/16 |
| 4,749,393 A | * 6/1988 | Rowles et al. ................. 62/627 |
| 4,783,203 A | 11/1988 | Doshi ............................ 55/16 |
| 4,836,833 A | 6/1989 | Nicholas et al. ................ 55/16 |
| 4,857,078 A | 8/1989 | Watler .......................... 55/16 |
| 4,892,564 A | 1/1990 | Cooley .......................... 55/16 |
| 5,053,067 A | 10/1991 | Chretien ........................ 62/24 |
| 5,082,481 A | 1/1992 | Barchas et al. ................. 62/23 |
| 5,082,551 A | 1/1992 | Reynolds et al. ............. 208/100 |
| 5,089,033 A | 2/1992 | Wijmans ....................... 55/16 |
| 5,157,200 A | 10/1992 | Mikkinen et al. ............ 585/803 |
| 5,199,962 A | 4/1993 | Wijmans ....................... 55/16 |
| 5,205,843 A | 4/1993 | Kaschemekat et al. ......... 55/16 |
| 5,278,344 A | 1/1994 | Gosling et al. ............. 585/322 |
| 5,332,424 A | 7/1994 | Rao et al. ...................... 95/47 |
| 5,332,492 A | 7/1994 | Maurer et al. ............... 208/340 |
| 5,354,547 A | 10/1994 | Rao et al. .................... 423/650 |
| 5,374,300 A | 12/1994 | Kaschemekat et al. ......... 95/39 |
| 5,435,836 A | 7/1995 | Anand et al. ................... 95/49 |
| 5,447,559 A | 9/1995 | Rao et al. ........................ 96/4 |
| 5,507,856 A | 4/1996 | Rao et al. ....................... 95/50 |
| 5,634,354 A | 6/1997 | Howard et al. ............... 62/624 |
| 5,669,958 A | 9/1997 | Baker et al. .................... 95/50 |
| 5,689,032 A | 11/1997 | Krause et al. ............... 585/802 |
| 5,753,010 A | 5/1998 | Sircar et al. .................... 95/45 |
| 5,785,739 A | 7/1998 | Baker et al. .................... 95/39 |
| 5,980,609 A | 11/1999 | Baker et al. .................... 95/39 |
| 6,011,192 A | 1/2000 | Baker et al. ................. 585/818 |
| 6,165,350 A | * 12/2000 | Lokhandwala et al. ..... 208/103 |
| 6,179,996 B1 | * 1/2001 | Baker et al. ................. 208/103 |
| 6,183,628 B1 | * 2/2001 | Baker et al. ................. 208/100 |
| 6,190,536 B1 | * 2/2001 | Lokhandwala et al. ..... 208/103 |
| 6,350,371 B1 | * 2/2002 | Lokhandwala et al. ..... 208/134 |
| 6,428,606 B1 | * 8/2002 | Gottschlich et al. ........... 95/50 |

OTHER PUBLICATIONS

W.A. Bollinger et al., "Prism® Separators Optimize Hydrocraker Hydrogen," presented at AIChE 1983 Summer National Meeting, Session No. 66, Aug. 29, 1983.

W.A. Bollinger et al., "Optimizing Hydrocracker Hydrogen," Hydrocarbon Processing, Feb. 1995.

J.M. Abrardo et al., "Hydrogen Technologies to Meet Refiners' Future Needs," Hydrocarbon Processing, Feb. 1995.

H. Yamashiro et al., "Hydrogen Purification with Cellulose Acetate Membranes," presented at Europe–Japan Congress on Membranes and Membrane Processes, Jun. 18–21, 1984.

H. Yamashiro et al., "Plant Uses Membrane Separation," Hydrocarbon Processing, Feb. 1985.

"Polymeric Gas Separation Membranes," Paul and Yampolski (eds.).

"Membrane Technology for Hydrocarbon Separation," Membrane Associates Ltd.

* cited by examiner

*Primary Examiner*—Walter D. Griffin
(74) *Attorney, Agent, or Firm*—J. Farrant

(57) ABSTRACT

An improved process for separating hydrogen from hydrocarbons. The process includes a pressure swing adsorption step, a compression/cooling step and a membrane separation step. The membrane step uses a rubbery polymeric membrane selective for all $C_1$–$C_6$ hydrocarbons over hydrogen. The process can produce three products: a high-purity hydrogen stream, an LPG stream and a light hydrocarbon fuel gas stream.

38 Claims, 8 Drawing Sheets

HYDROGEN/HYDROCARBON SEPARATION PROCESS, INCLUDING PSA AND MEMBRANES

This application is a continuation-in-part of application Ser. No. 09/316,498, filed May 21, 1999, now U.S. Pat. No. 6,183,628, which is a continuation-in-part of application Ser. No. 09/273,207, filed Mar. 19, 1999, now U.S. Pat. No. 6,350,371, both of which are incorporated herein by reference.

FIELD OF THE INVENTION

The invention relates to oil refinery and petrochemical operations, and specifically to the treatment of off-gas streams containing hydrogen and mixed hydrocarbons from such operations by pressure swing adsorption and membrane gas separation.

BACKGROUND OF THE INVENTION

Besides providing the octane level needed for gasoline products, the catalytic reformer is the principal hydrogen producer within a refinery. An important aspect of reformer operation is to generate as much hydrogen as possible, consistent with other requirements, of a quality suitable for use in the hydrogen-consuming units, particularly hydrocrackers and hydrotreaters.

The overhead vapor from the reformer reactors is typically split into at least two portions, one for recycle in the reactor loop, the other that forms a purge from the loop and that is the source of the net hydrogen product. This reactor purge stream is often sent to pressure swing adsorption (PSA) for upgrading to a high purity hydrogen product, typically containing 99% or more hydrogen. The hydrocarbon tail gas stream created when the PSA beds are regenerated is frequently treated as a waste gas stream and sent in its entirety to the plant fuel header.

Use of pressure swing adsorption (PSA) for this upgrading step is taught, for example, in U.S. Pat. No. 5,332,492, in which PSA tail gas is returned to the contactor section of the phase-separation steps, and U.S. Pat. No. 5,278,344, in which PSA is used to purify the net hydrogen stream after catalytic reforming and in front of a hydrodealkylation step.

It is also possible to use PSA to treat other diverse streams containing mixtures of hydrogen and hydrocarbons in refineries and elsewhere. Representative examples of such hydrogen-containing streams include overhead streams from fractionation columns used downstream of catalytic crackers, hydrocrackers and the like, overhead streams from cryogenic and other condensation units, overhead streams from absorbers, effluent streams from steam reformers, and refinery and petrochemical waste streams in general.

It is also known to use membrane separation for removing hydrogen from hydrocarbons in gas streams from various sources. U.S. Pat. Nos. 4,362,613, and 4,367,135, both to Monsanto, describe processes for treating the vapor from phase separators in a hydrocracking plant by passing the vapor across a membrane that is selectively permeable to hydrogen. The process yields a hydrogen-enriched permeate that can be recompressed and recirculated to the reactor. A similar process is shown and described in U.S. Pat. No. 5,082,551, to Chevron. U.S. Pat. No. 4,548,619, to UOP, shows membrane treatment of the overhead gas from an absorber treating effluent from benzene production. The membrane again permeates the hydrogen selectively and produces a hydrogen-enriched gas product that is withdrawn from the process. U.S. Pat. No. 5,053,067, to L'Air Liquide, discloses removal of part of the hydrogen from a refinery off-gas to change the dewpoint of the gas to facilitate downstream treatment. U.S. Pat. No. 5,082,481, to Lummus Crest, describes removal of carbon dioxide, hydrogen and water vapor from cracking effluent, the hydrogen separation being accomplished by a hydrogen-selective membrane. U.S. Pat. No. 5,157,200, to Institut Francais du Petrole, shows treatment of light ends containing hydrogen and hydrocarbons, including using a hydrogen-selective membrane to separate hydrogen from other components. U.S. Pat. No. 5,689,032, to Krause/Pasadyn, discusses a method for separating hydrogen and hydrocarbons from refinery off-gases, including multiple low-temperature condensation steps and a membrane separation step for hydrogen removal. U.S. Pat. No. 5,785,739, to Membrane Technology and Research, describes a process for recovering light olefins from gas streams produced by a steam cracker, by a combination of condensation and membrane separation.

The use of certain polymeric membranes to treat off-gas streams in refineries is also described in the following papers: "Prism™ Separators Optimize Hydrocracker Hydrogen", by W. A. Bollinger et al., presented at the AIChE 1983 Summer National Meeting, August 1983; and "Optimizing Hydrocracker Hydrogen" by W. A. Bollinger et al., in Chemical Engineering Progress, May 1984. The use of membranes in refinery separations is also mentioned in "Hydrogen Technologies to Meet Refiners' Future Needs", by J. M. Abrardo et al. in Hydrocarbon Processing, February 1995. This paper points out the disadvantage of membranes, namely that they permeate the hydrogen, thereby delivering it at low pressure, and that they are susceptible to damage by hydrogen sulfide and heavy hydrocarbons. Papers that specifically concern treatment of reformer off-gases are "Hydrogen Purification with Cellulose Acetate Membranes", by H. Yamashiro et al., presented at the Europe-Japan Congress on Membranes and Membrane Processes, June 1984; and "Plant Uses Membrane Separation", by H. Yamashiro et al., in Hydrocarbon Processing, February 1985. In these papers, a system and process using membranes to treat the overhead gas stream from the absorber/recontactor section of the plant are described. All of these papers describe system designs using cellulose acetate or similar membranes that permeate hydrogen and reject hydrocarbons.

A chapter in "Polymeric Gas Separation Membranes", D. R. Paul et al. (Eds.) entitled "Commercial and Practical Aspects of Gas Separation Membranes", by Jay Henis describes various hydrogen separations that can be performed with hydrogen-selective membranes.

Literature from Membrane Associates Ltd., of Reading, England, shows and describes a design for pooling and downstream treating various refinery off-gases, including passing of the membrane permeate stream to subsequent treatment for LPG recovery.

Other references that describe membrane-based separation of hydrogen from gas streams in a general way include U.S. Pat. Nos. 4,654,063 and 4,836,833, to Air Products and Chemicals, and U.S. Pat. No. 4,892,564, to Cooley. U.S. Pat. No. 4,857,078, to Watler, mentions that, in natural gas liquids recovery, streams that are enriched in hydrogen can be produced as retentate by a rubbery membrane.

The use of rubbery polymeric membranes operated at low temperature to separate methane from nitrogen is taught in U.S. Pat. No. 5,669,958.

It has also been recognized that condensation and membrane separation may be combined, as is shown in U.S. Pat.

Nos. 5,089,033; 5,199,962; 5,205,843, 5,374,300 and 5,980,609. Such combination is also described in patent application Ser. No. 09/316,507, now U.S. Pat. No. 6,159,272.

Numerous patents describe combinations of membrane separation with PSA. Representative examples include U.S. Pat. Nos. 4,229,188; 4,238,204; 4,398,926; 4,690,695; 4,701,187; and 4,783,203. U.S. Pat. No. 5,332,424, to Air Products and Chemicals, describes fractionation of a gas stream containing hydrocarbons and hydrogen using an "adsorbent membrane". The membrane is made of carbon, and selectively adsorbs hydrocarbons onto the carbon surface, allowing separation between various hydrocarbon fractions to be made. Hydrogen tends to be retained in the membrane residue stream. Optionally, the membrane separation step is followed by PSA treatment. Other Air Products patents that show application of carbon adsorbent membranes to hydrogen/hydrocarbon separations include U.S. Pat. Nos. 5,354,547; 5,447,559; and 5,507,856, which all show combinations of carbon adsorbent membranes followed by PSA. U.S. Pat. No. 5,634,354 discloses removal of hydrogen from hydrogen/olefin streams. In this case, the membrane used to perform the separation is either a polymeric membrane selective for hydrogen over hydrocarbons or a carbon adsorbent membrane selective for hydrocarbons over hydrogen.

U.S. Pat. No. 5,435,836, concerns treatment of mixtures of hydrogen, carbon dioxide, carbon monoxide and methane from steam reformers. The gas mixture from the steam reformer is treated by PSA to recover a high purity hydrogen stream. The waste gas from the PSA unit is then treated by membrane separation using a carbon adsorbent membrane. The hydrogen-rich residue is returned to the PSA unit and the permeate gas from the membrane unit can optionally be used as fuel for the steam reformer. U.S. Pat. No. 5,753,010 discloses a process similar to that of U.S. Pat. No. 5,435,836, but in which the tail gas from the PSA unit is split into two fractions of unlike composition, which are treated separately in two discrete membrane steps.

U.S. Pat. No. 6,011,192 describes the use of a polymeric membrane unit before a PSA unit to remove $C_5$–$C_8$ hydrocarbons from the gas stream prior to its entry into the PSA separation step.

Patent application Ser. No. 09/083,784, now U.S. Pat. No. 6,190,536, describes treatment of off-gases from fluid catalytic cracking absorbers using hydrocarbon-selective membranes.

Patent applications Ser. Nos. 09/083,660 and 09/317,106, now U.S. Pat. Nos. 6,171,472 and 6,264,828, describe treatment of overhead gases in hydrocarbon conversion reactors of any type by passing gases in the reactor recycle loop across hydrocarbon-selective membranes.

Patent application Ser. No. 09/083,872, now U.S. Pat. No. 6,190,540, describes such a process applied specifically to hydrotreaters and hydrocrackers.

Patent application Ser. No. 09/316,508, now U.S. Pat. No. 6,179,996, describes such a process applied specifically to hydrogenation reactors.

Patent application Ser. No. 09/083,653, now U.S. Pat. No. 6,165,350, describes the use of hydrogen-rejecting membranes to directly treat overhead gases from the phase separators of catalytic reformers.

Patent application Ser. No. 09/471,302 copending and co-owned with the present application, describes the use of a membrane unit before a steam reformer to create a hydrogen-rich stream that bypasses the steam reformer and passes instead to PSA treatment.

Patent application Ser. No. 09/273,207 now U.S. Pat. No. 6,350,371, describes an improved catalytic reforming process in which PSA is used to recover hydrogen from the reformer off-gas and membrane separation is used to treat the PSA tail gas.

Patent application Ser. No. 09/316,498, now U.S. Pat. No. 6,183,628, of which the present application is a continuation-in-part, describes a process involving PSA, compression/condensation and membrane separation for separating hydrogen from hydrocarbons.

All of the copending and co-owned patent applications referred to above are incorporated herein by reference.

SUMMARY OF THE INVENTION

The invention is an improved process for treating mixed hydrogen/hydrocarbon effluent streams from refinery, petrochemical and other operations. The invention separates a stream containing at least hydrogen, methane, ethane and $C_{3+}$ hydrocarbons into two or three streams: a hydrogen-enriched stream suitable for use as a source of hydrogen, an ethane-enriched stream suitable for use as fuel gas, and, optionally, a liquid $C_{3+}$ hydrocarbon stream suitable for use as a source of LPG. Streams suitable for treatment by the process of the invention range from hydrocarbon lean streams, for example, containing less than 10% total hydrocarbons, to hydrocarbon rich streams, for example, containing as much as 50% or more total hydrocarbons. Typically the hydrocarbons present in the stream are in the $C_1$–$C_8$ range, with the majority of the content being $C_1$–$C_6$ hydrocarbons.

In its most simple form, the invention includes three unit operations or steps: a pressure swing adsorption (PSA) step to separate a high-purity hydrogen stream from the effluent stream; a compression/cooling step that may result in the formation of liquefied $C_{3+}$ hydrocarbons; and a membrane separation step to separate remaining light hydrocarbons from hydrogen.

In a basic embodiment, these steps take the following form:

(a) passing a stream comprising hydrogen, methane, ethane and $C_{3+}$ hydrocarbons through a pressure swing adsorption unit, thereby producing a hydrogen-enriched product stream and a tail gas stream;

(b) compressing and then cooling the tail gas stream, thereby optionally producing a condensed $C_{3+}$ hydrocarbon stream and producing an uncondensed stream;

(c) passing the uncondensed stream across the feed side of a membrane separation unit containing a rubbery polymeric membrane having a feed side and a permeate side, and being selectively permeable to $C_1$–$C_6$ hydrocarbons over hydrogen;

(d) withdrawing from the permeate side a permeate stream enriched in ethane and $C_{3+}$ hydrocarbons, and optionally enriched in methane, compared with the uncondensed stream;

(e) withdrawing from the feed side a residue stream enriched in hydrogen compared with the uncondensed stream.

Preferably, the membrane separation step of the process is carried out under conditions that provide a selectivity for ethane over hydrogen of at least about 3.5, more preferably at least about 4 and most preferably at least about 5.

In the case that the feed stream to the membrane separation unit is comparatively lean in $C_{3+}$ hydrocarbons and the membrane separation step is performed at sub-zero temperatures, for example, it is also possible and it is desirable to carry out the process to provide a permeate stream that is enriched in methane as well as ethane compared with the membrane feed stream.

The tail gas from regeneration of the PSA beds is typically at comparatively low pressure, for example about 50 psia. Production of a liquid $C_{3+}$ hydrocarbons stream in step (b) is facilitated, therefore, by compressing the tail gas to a few hundred psi in addition to cooling it. Compressing the tail gas stream also provides an increased driving force for the membrane permeation step. In addition, the compression/cooling step produces a membrane feed stream at a lowered temperature, which increases the methane/hydrogen and ethane/hydrogen selectivity of the membrane.

Preferably, the invention includes an additional step of recirculating at least a portion of the hydrogen-enriched membrane residue stream to the pressure swing adsorption unit, thereby increasing the amount of high-purity hydrogen produced by the process.

Optionally, at least a portion of the membrane permeate stream may be recirculated to the compression/cooling step.

The invention has an important advantage over other polymeric membrane separation processes that have been used in the industry in the past: all hydrocarbons, including methane, can permeate the membrane preferentially if desired, leaving a residue stream on the feed side that is concentrated in the slower-permeating hydrogen. The use of hydrocarbon-selective, hydrogen-rejecting polymeric membranes means that the hydrogen-enriched stream is retained on the feed side of the membrane. In other words, the hydrogen-enriched stream withdrawn from the membrane separation unit remains at pressure, which is desirable for recycle to the adsorption unit, as well as for facilitating delivery to other destinations in embodiments in which the residue stream is not recycled in the process. In contrast, hydrogen-selective membranes deliver a hydrogen-enriched stream at the comparatively low pressure of the permeate side, and this stream must almost always be recompressed for further treatment or use.

The use of polymeric materials for the membranes renders the membranes easy and inexpensive to prepare, and to house in modules, by conventional industrial techniques, unlike other types of hydrogen-rejecting membranes, such as finely microporous inorganic membranes, including adsorbent carbon membranes, pyrolysed carbon membranes and ceramic membranes, which are difficult and costly to fabricate in industrially useful quantities.

The invention has a number of advantages, including but not limited to:

increased hydrogen production compared with prior art techniques
production of a discrete LPG stream
ability to debottleneck plants where fuel gas production is at maximum.

Optionally, the hydrogen-rich stream from the membrane separation operation may be sent to a second membrane separation step to provide additional separation between the remaining light hydrocarbons and hydrogen. In this case, it is preferred to recirculate the permeate from the first membrane separation step to the compression/cooling step, to recirculate the hydrogen-rich residue from the second membrane separation step to the PSA step and to withdraw the ethane-enriched permeate from the second membrane separation step for use as fuel gas or to send to any other desired destination.

The preferred membranes used in the present invention can permeate all of the hydrocarbons, hydrogen sulfide and water vapor preferentially over hydrogen, and are capable of withstanding exposure to these materials even in comparatively high concentrations. This contrasts with cellulose acetate and like membranes, which must be protected from exposure to heavy hydrocarbons and water. If liquid water or $C_{3+}$ hydrocarbons condense on the surface of such membranes, which can happen if the temperature within the membrane modules is lower than the upstream temperature and/or as the removal of hydrogen through the membrane increases the concentration of other components on the feed side, the membranes can suffer catastrophic failure. On the other hand, the membranes used in the invention preferentially and rapidly pass these components, so they do not build up on the feed side. Thus, the membranes can handle a wide diversity of stream types. This is a differentiating and important advantage over processes that have previously been available.

Most significantly, the invention provides processes that can separate $C_1$–$C_2$ hydrocarbons and $C_{3+}$ hydrocarbons from hydrogen with a practical, industrially useful selectivity, and retain the hydrogen at high pressure.

It is to be understood that the above summary and the following detailed description are intended to explain and illustrate the invention without restricting its scope.

DETAILED DESCRIPTION OF THE INVENTION

Figure 1:
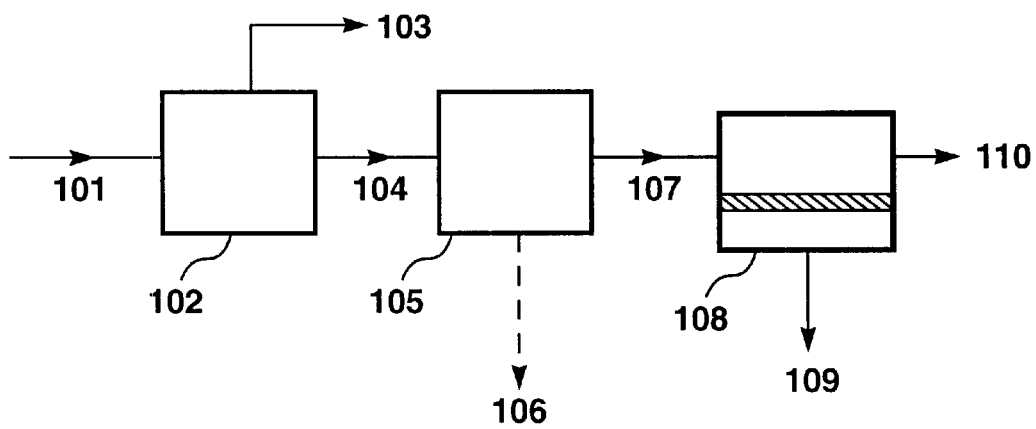
FIG. 1 is a schematic drawing showing a basic embodiment of the invention.

The terms gas and vapor are used interchangeably herein.

The term $C_{2+}$ hydrocarbon means a hydrocarbon having at least two carbon atoms; the term $C_{3+}$ hydrocarbon means a hydrocarbon having at least three carbon atoms; and so on.

The term lightest hydrocarbons means a $C_1$ or $C_2$ hydrocarbon.

The term light hydrocarbons means $C_1$–$C_6$ hydrocarbons.

The term heavier hydrocarbons means $C_{3+}$ hydrocarbons.

The term hydrocarbon includes substituted hydrocarbons.

Percentages herein are by volume unless otherwise stated.

In its most basic form, the invention is an improved process for treating effluent streams from refinery, petrochemical and other operations. The invention separates a stream containing at least hydrogen, methane, ethane, and $C_{3+}$ hydrocarbons into two or three streams: a hydrogen-enriched stream suitable for use as a source of hydrogen, an ethane-enriched stream suitable for use as fuel gas, and optionally a liquid $C_{3+}$ hydrocarbons stream suitable for use as a source of LPG.

The process can be applied to many gas streams containing such a mix of components. Streams that may be treated by the process of the invention include, but are not limited to, streams from unit operations in refineries, such as catalytic reforming, hydrocracking, catalytic cracking and isomerization; and streams from petrochemical and other chemical manufacturing operations, such as dealkylation, hydrogenation, steam cracking and ammonia production. Streams of diverse compositions may be treated. By way of a representative, but not limiting, example, a typical lean stream suitable for treatment might contain 90% hydrogen, 5% methane and ethane, 3% propane, 1.5% $C_4$ hydrocarbons, and 0.5% $C_5$–$C_6$ hydrocarbons. Likewise, a representative hydrocarbon-rich stream suitable for treatment might contain 60% hydrogen, 20% methane and ethane, 15% $C_3$–$C_4$ hydrocarbons, 3% $C_5$–$C_6$ hydrocarbons, 1% $C_{6+}$ hydrocarbons, and 1% other non-hydrocarbon components. Streams containing substantial amounts of $C_{6+}$ hydrocarbons, such as more than about 1%, can be treated by the process of the invention, but are less suitable for treatment because the heaviest hydrocarbon components are difficult to desorb from the PSA beds. If it is desired to process such streams, a pretreatment step may optionally be used to condense or otherwise remove the heaviest components before the stream is fed to the process. Many or most streams to be treated may contain at least a minor amount of $C_5$ and/or $C_6$ hydrocarbons, by which is meant at least about 0.1% total $C_5$–$C_6$ hydrocarbons. If large quantities of $C_5$–$C_6$ hydrocarbons are present, however, such as more than about 5%, it is again preferred to pretreat the stream to remove at least part of the heaviest components to avoid build-up of these components in the PSA beds.

In a basic aspect, the invention includes three unit operations or steps: a pressure swing adsorption (PSA) step to separate a high-purity hydrogen stream from the effluent stream; a compression/cooling step that may result in formation of liquefied $C_{3+}$ hydrocarbons; and a membrane separation step to separate the remaining hydrocarbons from hydrogen. The membrane separation step uses a rubbery polymeric membrane, preferably polysiloxane, that is selective for all hydrocarbons in the stream, including methane and ethane, over hydrogen.

The invention in its basic aspect is shown schematically in FIG. 1. It will be appreciated by those of skill in the art that this and the other figures described below are very simple schematic diagrams, intended to make clear the key aspects of the invention, and that an actual process train will usually include many additional components of a standard type, such as compressors, heaters, chillers, condensers, pumps, blowers, other types of separation and/or fractionation equipment, valves, switches, controllers, pressure-, temperature-, level- and flow-measuring devices and the like. Referring to this figure, feed stream 101, containing at least methane, ethane, hydrogen and a $C_{3+}$ hydrocarbon, passes to PSA treatment step 102. The goal of this step is to provide a supply of hydrogen, typically, but not necessarily, of better than 99% purity, for reuse in the process from which stream 101 originates, or elsewhere, such as in hydrotreating or hydrocracking.

PSA systems usually comprise a series of beds of a zeolite or similar material that will selectively sorb one or more components of the gas mixture. The beds are connected in such a way that each bed can be switched periodically from adsorption mode to regeneration mode. As one bed or set of beds is taken off-line for regeneration, another bed or set of beds is switched in so that gas can be processed continuously. In the sorption mode, which is typically carried out at elevated pressure, typically above 150 psia, such as 200 psia, 300 psia, 500 psia or above, hydrocarbons are adsorbed onto the active beds. In the present invention, the adsorption step is carried out preferably at a pressure no higher than about 750 psia, and more preferably in the range 50–500 psia. The gas exiting the bed, stream 103, typically has a very high hydrogen content, such as 99 vol % hydrogen or higher.

When the adsorbing beds have been charged to the desired level, they are switched into desorption/regeneration mode. The desorption/regeneration step can be carried out by any convenient techniques known in the art. Such techniques include, but are not limited to, passing a displacement gas cocurrently through the bed to sweep out unadsorbed gas from the void spaces, cocurrent depressurization of the bed to position the mass transfer front appropriately, countercurrent depressurization to remove previously adsorbed gas, and countercurrent purging to complete regeneration of the bed for reuse.

Depressurization of the bed during these steps may take place by multiple reductions in pressure, as is known in the art, and may reduce the pressure to atmospheric pressure (15 psia) or below. Removal of void space gas and positioning of the mass transfer front is preferably carried out, however, at a pressure in the range 50–250 psia, and countercurrent desorption is preferably carried out at a pressure no lower than 15 psia, more preferably in the range 15–75 psia, yet more preferably no lower than about 30 psia and most preferably no lower than about 50 psia.

By way of non-limiting example, a typical bed cycle may be: (i) adsorption at 500 psia; (ii) depressurization to 200 psia under cocurrent flow conditions; (iii) depressurization to 50 psia under countercurrent flow conditions; (iv) purging at 50 psia; (v) repressurization.

The hydrogen product stream is withdrawn from the process as stream 103. The hydrocarbon gases that are removed during the desorption/regeneration steps are shown generally in FIG. 1 as stream 104. In practice, several streams of different compositions will be produced during the individual parts of the regeneration cycle. It is within the scope of the invention to treat only one of these streams, or some other portion of the total, in the remaining steps 105 and 108, but is preferred to treat all of the PSA off gas, or tail gas, as shown in FIG. 1.

In the aggregate, tail gas stream 104 has a typical composition of about 40%, 50% or 60% hydrogen and 60%, 50% or 40% mixed $C_1$–$C_6$ hydrocarbons. This stream is passed to compression/cooling step 105. This step has two functions: one, to facilitate the subsequent membrane separation step and downstream recycle or treatment, and two, if desired, to condense part of the $C_{3+}$ hydrocarbons content of stream 104 to produce an LPG or liquefied light hydrocarbon product. Any type of compressor may be used to compress stream 104, and the desired pressure may be reached in one or multiple stages. Preferably, the stream is raised to a pressure in the range 150–750 psia, and most preferably in the range about 300–400 psia.

The stream must then be cooled in the aftercooler section of the compression/cooling step. Cooling may be performed in any manner, including, but not limited to, simple air aftercooling of the compressor outlet gases, heat exchange against other streams, such as the streams entering or leaving the membrane unit, chilling by external refrigerants, and any combinations of these. Such methods are familiar to those of skill in the art. It is desirable to avoid cooling to very low temperatures, since reaching these adds to the cost and complexity of the process. By very low temperatures, we mean temperatures below about −40° C. The temperature to which the gas is cooled in step 105 should preferably be above about −40° C., more preferably above −20° C., yet more preferably above −10° C. and most preferably above 0° C. Temperatures down to the preferred lower limit of −40° C. should be possible to reach by single-stage refrigeration, for example using propylene as the cooling refrigerant.

The degree of cooling to which the gas is subjected also depends to some extent on the desired result. If LPG is required as a discrete product stream from this step, then a lower temperature is likely to be needed than if the only goal is to bring the temperature of the compressor exhaust back to a level suitable for the membrane separation step. In general, it is preferred that the gas emerging from the cooling step be at a temperature in the range +40° C. to −40° C., more preferably in the range 20° C. to −20° C., and most preferably in the range 0–20° C.

If the compression/cooling step results in condensation of a liquid hydrocarbon fraction, stream 106, the stream is withdrawn from the process, and may be sent to any desired destination.

Gas stream 107 leaving the compression/cooling step contains at least hydrogen, ethane and a $C_{3+}$ hydrocarbon, and typically also contains methane and multiple $C_{3+}$ hydrocarbons. Stream 107 passes to membrane separation step 108. The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as hydrogen and methane, faster than larger, more condensable molecules, such as $C_{3+}$ organic molecules. For rubbery or elastomeric polymers, the difference in size is much less critical, because the polymer chains can be flexed, and sorption effects generally dominate the permeability. Elastomeric materials, therefore, tend to permeate larger, condensable molecules faster than small, low-boiling molecules. Thus, most rubbery materials are selective in favor of all $C_{3+}$ hydrocarbons over hydrogen. Examples of polymers that can be used to make such elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, and thermoplastic polyolefin elastomers. For the smallest, least condensable hydrocarbons, even rubbery polymers tend to be selective in favor of hydrogen, because of the relative ease with which the hydrogen molecule can diffuse through most materials. For example, neoprene rubber has a selectivity for hydrogen over methane of about 4, natural rubber a selectivity for hydrogen over methane of about 1.6, and Kraton, a commercial polystyrene-butadiene copolymer, has a selectivity for hydrogen over methane of about 2. Therefore, although any of the rubbery membrane materials mentioned above are useful for providing separation of $C_{3+}$ hydrocarbons from hydrogen, even most rubbery materials are poorly suited for the type of separation required in the present invention. To applicants' knowledge, among the polymeric membranes that perform gas separation based on the solution/diffusion mechanism, silicone rubber, specifically polydimethylsiloxane (PDMS) and closely related polymers are the only materials that are selective in favor of methane over hydrogen, and thus are preferred for use within the scope of the invention. Other materials that we expect may be found to be methane/hydrogen selective include other polysiloxanes, such as other alkyl-substituted siloxanes, copolymers of PDMS or other alkyl-substituted siloxane with other materials, and the like. For example, U.S. Pat. No. 4,370,150 cites data for silicone-polycarbonate copolymer membranes that suggest a pure gas selectivity of about 1.3 for methane over hydrogen, but this would, of course, depend on the exact composition of the polymer and the other components of an actual gas.

As discussed in parent application Ser. No. 09/316,498, now U.S. Pat. No. 6,183,628, we have found that with a multicomponent mixture containing hydrogen, methane, ethane and $C_{3+}$ hydrocarbons, the methane/hydrogen selectivity of a silicone rubber membrane increases with decreasing temperature, reaching a value of 2, 3 or above at temperatures below −20° C. Similarly, the ethane/hydrogen selectivity increases from about 2 at 30° C. to 5, 10 or above at sub-zero temperatures.

On this basis, and taking into account also the preferred operating temperatures for the upstream condensation step, the preferred operating temperature for the membrane separation step 108 is in the range 20° C. to −40° C., and most preferably is below 0° C. The operating temperature of the membrane separation step will tend to be lower than that of the compression/cooling step, because of the Joule-Thomson cooling brought about during the membrane separation by expansion of the condensable hydrocarbon gases permeating the membrane.

Under the preferred operating conditions the process is able to achieve an ethane/hydrogen selectivity in the membrane separation step of at least about 3.5. More preferably, the membrane separation step is operated under conditions that provide an ethane/hydrogen selectivity of at least about 4, and yet more preferably at least about 5.

In the case that the feed stream to the membrane separation unit is comparatively lean in $C_{3+}$ hydrocarbons and the membrane separation step is performed at sub-zero temperatures, it is also possible and it is desirable to carry out the process to provide a permeate stream that is enriched in methane as well as ethane compared with the membrane feed stream.

The membrane may take any convenient form known in the art. The preferred form is a composite membrane including a microporous support layer for mechanical strength and a rubbery polymeric coating layer, most preferably silicone rubber, that is responsible for the separation properties. Additional layers may be included in the structure as desired, such as to provide strength, protect the selective layer from abrasion, and so on.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice. Since conventional polymeric materials are used for the membranes, they are relatively easy and inexpensive to prepare and to house in modules, compared with other types of membranes that might be used as hydrogen-rejecting membranes, such as finely microporous inorganic membranes, including adsorbent carbon membranes, pyrolysed carbon membranes and ceramic membranes.

To achieve a high transmembrane hydrocarbon flux, the selective layer responsible for the separation properties should be thin, preferably, but not necessarily, no more than 30 μm thick, more preferably no more than 20 μm thick, and most preferably no more than about 10 μm thick. Although composite membranes with silicone rubber selective layers of just 1 or 2 μm thick can be made, extremely thin membranes, such as less than about 5 μm thick, are not preferred, since the resulting extremely high fluxes may give rise to a permeant-depleted boundary layer at the membrane surface on the feed side, and hence to overall diminished separation performance.

A driving force for transmembrane permeation is provided by a pressure difference between the feed and permeate sides of the membrane. Most preferably, this driving force is provided simply by compression/cooling step 105, from which membrane feed stream 107 emerges at an elevated pressure, typically of a few hundred psi. The pressure on the permeate side may be atmospheric, or may be maintained at an above-atmospheric or below-atmospheric pressure convenient with respect to the destination of the permeate stream. As a general guide, a pressure ratio (feed pressure/permeate pressure) of at least about four or five is preferred.

By selectively removing hydrocarbon components, the membrane separation step results in a membrane residue stream, 110, that is enriched in hydrogen compared with the membrane feed stream, 107. Typically, but not necessarily, stream 110 will contain more than 60% hydrogen, such as 70% hydrogen, 80% hydrogen, 90% hydrogen or more. This stream can be sent to any desired destination. For example, it may be returned to the process from which stream 101 originates, or cascaded to another process within the refinery or chemical plant. Most preferably, at least a portion of the stream is returned to the inlet side of the PSA unit for additional hydrogen recovery, as illustrated with respect to FIG. 2.

The membrane separation step also results in a permeate stream, 109, that is enriched in ethane and $C_{3+}$ hydrocarbons compared with the membrane feed stream 107. As mentioned above, depending on the membrane feed composition and operating conditions, the permeate stream may also be slightly enriched in methane compared with the feed stream. The permeate stream can be sent to any desired destination, such as directly to the plant fuel header, to further treatment, or to a saturated gas plant for splitting into separate $C_2$–$C_5$ hydrocarbon fractions. The stream may also be of suitable composition to serve as feed to a steam reformer. Most preferably, particularly if it contains a high percentage of $C_{3+}$ hydrocarbons, such as above 10% hydrocarbons, at least a portion of stream 109 is recirculated to the compression/cooling step, as illustrated below with respect to FIG. 2.

If the permeate stream is recirculated to the compression/cooling step in its entirety, then at least a portion of the membrane residue stream should be withdrawn as a purge stream to prevent build-up of the lightest hydrocarbons in the process. This may be done by withdrawing a part of the residue stream, and recirculating the rest to the PSA step, for example.

Figure 2:
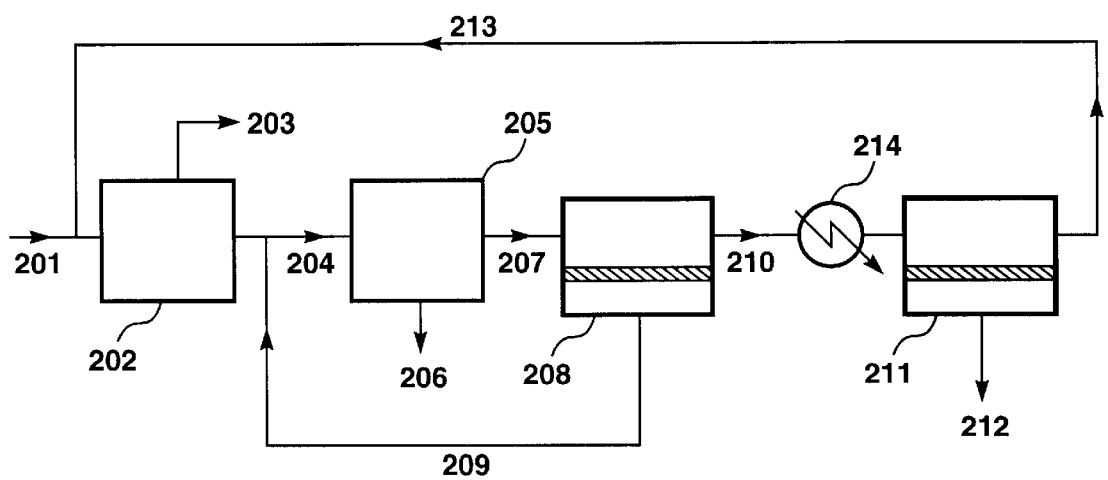
FIG. 2 is a schematic drawing showing a preferred embodiment of the invention in which an additional membrane step is used to provide selective purging of the lightest hydrocarbons.

Turning now to FIG. 2, this shows a preferred embodiment of the invention in which a second membrane separation step is used to provide more selective purging of the lightest hydrocarbons. Such an embodiment is particularly preferred for treating gas streams that are relatively rich in heavier hydrocarbon components, such as containing more than about 10% $C_{3+}$ hydrocarbons and/or more than about 1% $C_{5+}$ hydrocarbons. Referring to the figure, stream 201 is passed to and treated in PSA unit 202 to form high-purity hydrogen product stream 203. Hydrocarbon tail gas stream 204, from one or more of the regeneration cycles of the PSA beds, is combined with hydrogen-depleted permeate stream 209 and introduced into compression/cooling step 205. This step is carried out under pressure/temperature conditions that give rise to liquefaction of a portion of the hydrocarbons. LPG stream 206, which is rich in $C_{3+}$ hydrocarbons, is withdrawn from the process.

The uncondensed gas, stream 207, leaves the compression/cooling step and passes to first membrane separation step 208. The first membrane separation step divides stream 207 into permeate stream 209, enriched in hydrocarbons and depleted in hydrogen, and residue stream 210, enriched in hydrogen and depleted in hydrocarbons. The permeate stream is recirculated to the inlet side of the compression/cooling step. In this case, since two membrane separation steps are used, it is not required that step 208 provide separation of the lightest hydrocarbons, so any membrane that is selective for $C_{3+}$ hydrocarbons over hydrogen, such as rubbery membranes and superglassy membranes, may be used in this step. Such membranes will also permeate any water vapor present in the feed gas, leaving a dry residue gas, and thereby facilitating the use of sub-zero temperatures in the second membrane separation step without concern about ice formation.

Residue stream 210 is withdrawn from membrane unit 208. In this embodiment, the process involves returning a portion of the hydrogen recovered from the PSA tail gas for additional recovery by the PSA unit, and purging a portion of the gas to control build up of methane, ethane or other light contaminants in the process loops. In this case, however, the purging is done by means of an additional membrane step, 211. This second membrane step is carried out using membranes the requirements for which are the same as those discussed above with respect to FIG. 1, namely that they be rubbery polymeric membranes selective for methane over hydrogen. Thus, for this step, polysiloxane membranes are preferred, and silicone rubber membranes are most preferred. The preferred temperature operating range for the membrane in this step is between 20° C. and −40° C., and the step preferably provides an ethane/hydrogen selectivity of at least about 3.5, 4 or most preferably, 5.

As the gas has already passed through the first membrane separation step, stream 210 is substantially lighter in $C_{3+}$ hydrocarbon content than stream 207. However, stream 210 is usually as much as 5° C., 10° C., 15° C. or more colder than membrane feed stream 207 as a result of Joule-Thomson cooling brought about by permeation of condensable hydrocarbons. This will usually result in a higher selectivity for the $C_1$–$C_2$ hydrocarbons in this second membrane step.

If stream 210 is not at a temperature low enough to provide the required selectivity in unit 211, it may be subjected to further optional cooling, 214, as indicated, before being introduced into unit 211. The second membrane separation step produces hydrogen-enriched residue stream 213, which is recirculated to the PSA step for additional hydrogen recovery, and hydrogen-depleted, ethane-enriched, and optionally methane-enriched, permeate purge stream, 212, which is sent to fuel gas or otherwise disposed of. In this manner, the amount of unrecovered material is reduced still further compared with the embodiment of FIG. 1.

As will be appreciated by those of skill in the art, the membrane area and operating parameters of the membrane separation steps described with respect to FIGS. 1 and 2 above can be varied to focus on specific targets, such as high LPG recovery, high hydrogen recovery, or low fuel gas production. One particular benefit of the invention is that it provides control of the amount of fuel gas produced by refinery and chemical industry operations. Prior art operations that use PSA to recover hydrogen have generally sent the entirety of the hydrocarbon waste stream resulting from regeneration of the PSA beds to the fuel line. The process of the invention provides the ability to reduce the gas sent to the fuel line by 50% or more, compared with the case in which PSA alone is used to treat the off gases. A useful result is that some plants that were previously bottlenecked by fuel gas production are able to increase throughput, thereby increasing product yield.

The invention has been described above as it includes three basic treatment steps, a PSA step, a compression/cooling step and a membrane separation step. In this most general form, the invention can treat gas streams from any source, including both gas streams created by a single unit operation, such as the recontacting step of a catalytic reformer train, and gas streams created by pooling off-gases from diverse operations.

When applied to a unit operation involving a conversion reaction of a hydrocarbon feedstock, such as takes place in a refinery or petrochemical plant, for example, catalytic reforming, hydrocracking, catalytic cracking, or hydrogenation, the invention provides an improved process and process train for carrying out such a unit operation. In this aspect, therefore, the invention comprises the following steps:

(a) reacting a hydrocarbon feedstock in a hydrocarbon conversion reactor;
(b) withdrawing an effluent stream comprising hydrogen and hydrocarbons from the reactor;
(c) separating from the effluent stream a liquid phase and a vapor phase, the vapor phase comprising hydrogen, methane, ethane and $C_{3+}$ hydrocarbons;
(d) optionally recirculating a portion of the vapor phase to the reactor system;
(e) passing an unrecirculated portion of the vapor phase through a pressure swing adsorption unit, thereby producing a hydrogen-enriched product stream and a tail gas stream;
(f) compressing and then cooling the tail gas stream, thereby optionally producing a condensed $C_{3+}$ hydrocarbon stream and producing an uncondensed stream;
(g) passing the uncondensed stream across the feed side of a membrane separation unit containing a rubbery polymeric membrane having a feed side and a permeate side, and being selectively permeable to $C_1$–$C_6$ hydrocarbons over hydrogen;
(h) withdrawing from the permeate side a permeate stream enriched in ethane and $C_{3+}$ hydrocarbons compared with the uncondensed stream;
(i) withdrawing from the feed side a residue stream enriched in hydrogen compared with the uncondensed stream.

Figure 8:
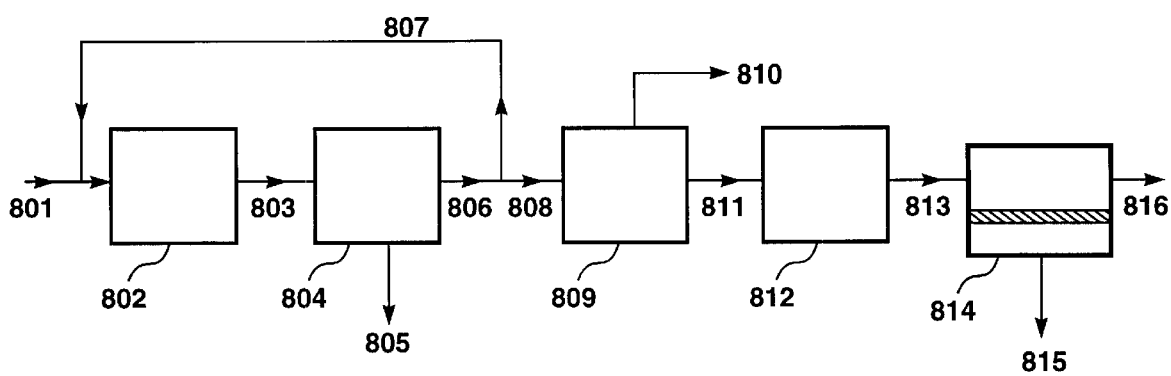
FIG. 8 is a schematic drawing showing an embodiment of the invention as it relates to an improved process train for a hydrocarbon conversion reactor.

Such a process is shown in FIG. 8. Referring to this figure, hydrocarbon feedstock stream, 801, and optional recycle stream, 807, enter the reaction step, 802. The reaction step may comprise any hydrocarbon conversion reaction that results in an effluent stream containing light hydrocarbons and hydrogen. Such reactions are well known in the art, as well as being discussed extensively in the copending applications referred to in the Background section above, and include, but are not limited to hydrocracking; hydrotreating; coking; catalytic reforming; isomerization; alkylation; dealkylation; steam reforming; hydrogenation; and dehydrogenation. The effluent stream, 803, is withdrawn from the reactor. The first treatment step required is to separate the stream into discrete liquid and gas phases, shown as streams 805 (liquid) and 806 (vapor) in FIG. 8. This phase-separation step is indicated simply as box 804, although it will be appreciated that it can be executed in one step or in multiple similar or dissimilar sub-steps, as discussed at length in the parent and other copending applications. If the effluent stream is predominantly in the gas phase, this step involves at least cooling the stream; if the effluent stream is predominantly in the liquid phase, this step involves at least pressure reduction to flash off the light components of low boiling point. The phase-separation step may also include other separation techniques, such as absorption, fractionation and the like.

The raw liquid hydrocarbon product stream, 805, is withdrawn and passed to further purification if required. The vapor phase, containing hydrogen, methane, ethane and $C_{3+}$ hydrocarbons, is withdrawn as stream 806. In many reaction processes, a portion of this stream, shown as stream 807, is returned without further treatment to the reactor, after pressure and temperature adjustment as necessary, and the remaining portion of the gas is purged from the reactor loop as stream 808, and passed to PSA treatment step 809. Alternatively, the entirety of stream 806 may be passed to the PSA step. As yet another alternative, portion 808 may be passed to the PSA step as shown, but portion 807, instead of being recirculated, may be passed to another destination. Thus, the process of the invention is limited in this regard only in that at least one phase separation step by cooling or flashing is carried out, and at least one portion of the vapor phase from the phase-separation steps passes to the PSA step. The PSA step, 809, is carried out as described above with respect to FIGS. 1 and 2, to yield a high-purity hydrogen product stream, 810, and one or more tail gas streams, 811. The tail gas passes to compression/cooling step 812, also carried out as described with respect to FIGS. 1 and 2 above, and optionally resulting in the production of a liquefied $C_{3+}$ hydrocarbons stream, not shown in this figure. The cooled, compressed gas, stream 813, passes to membrane separation step, 814, that uses a rubbery polymeric membrane selective for methane over hydrogen, and that yet again is carried out as described with reference to the previous figures, and preferably under conditions that provide an ethane/hydrogen selectivity of at least about 3.5, 4 or 5. The membrane separation step divides the uncondensed stream into residue stream 816, enriched in hydrogen and depleted in hydrocarbons, and permeate stream 815, enriched in ethane and $C_{3+}$ hydrocarbons, optionally enriched in methane, and depleted in hydrogen. Stream 816 may optionally be returned to the PSA step to increase the hydrogen yield of the process, and stream 815 may be sent to the fuel gas line or to any other desired destination.

The invention is now further described by the following examples, which are intended to be illustrative of the invention, but are not intended to limit the scope or underlying principles in any way.

EXAMPLES

Example 1
Preparation of Silicone Rubber Films

Dense, isotropic films of silicone rubber (polydimethylsiloxane) [PDMS] were made from a 4-wt % solution of silicone rubber in iso-octane (Silicone Dehesive 940 A, Wacker Silicone Corp., Adrian, Mich.). The silicone rubber solution contained a crosslinker (V 24) and a platinum-based catalyst. The solution was cast on a glass plate, and the solvent was evaporated at ambient conditions for one week. The films were then dried in a vacuum oven at 80° C. for 12 hours. The thickness of the resulting films was determined with a precision micrometer. Film samples with thicknesses of 100–300 μm (±1 μm) were used for the permeation experiments.

Example 2
Permeation Properties of Silicone Rubber Films with a Binary Gas Mixture An experiment was carried out to determine the performance of silicone rubber films at different temperatures. Films were prepared as in Example 1. Samples of the films were cut into 12.6-cm² stamps, and subjected to permeation tests in a permeation test-cell apparatus. The tests were performed using the constant pressure/variable volume method, with a gas mixture containing 50% hydrogen and 50% methane. The feed pressure was 150 psig, the permeate pressure was atmospheric (0 psig), and the feed temperature was varied between −20° C. and 35° C. The compositions of the residue and permeate were determined with a gas chromatograph equipped with a thermal conductivity detector, and permeabilities were calculated. The methane/hydrogen selectivity was calculated from the ratio of the permeabilities. The stage-cut, that is, the ratio of permeate to feed flow rate, was always less than 1%.

Figure 3:
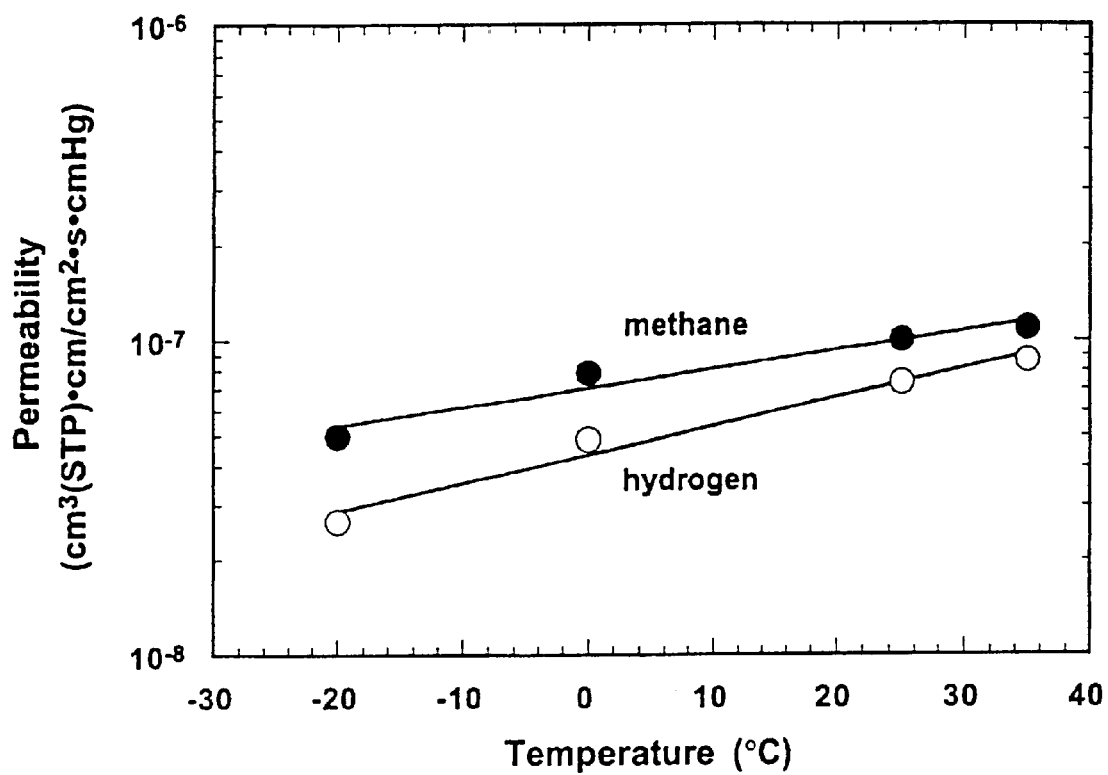
FIG. 3 is a graph showing the effect of temperature on the permeabilities of methane and hydrogen in a binary gas mixture through a silicone rubber film.
Figure 4:
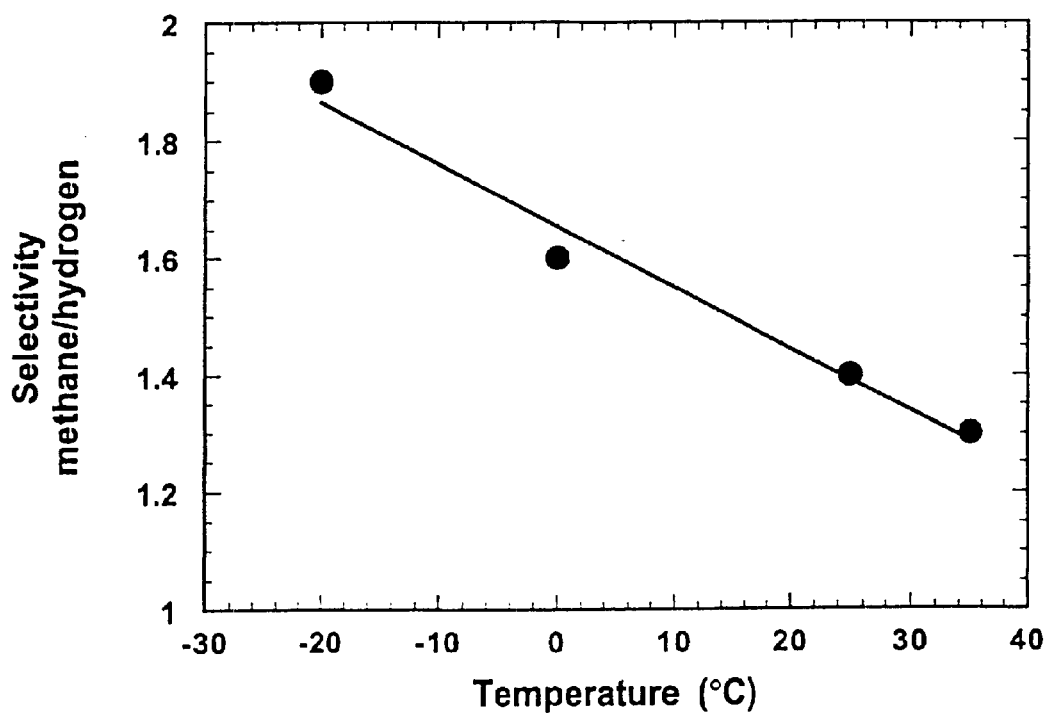
FIG. 4 is a graph showing the effect of temperature on the methane/hydrogen selectivity of a silicone rubber film measured with a binary gas mixture.

Permeability and selectivity results are shown in FIGS. 3 and 4, respectively, as a function of temperature. The methane and hydrogen permeabilities both decreased with decreasing feed temperature. Because the hydrogen permeability of silicone rubber exhibited a stronger temperature dependence than that of methane, the methane/hydrogen selectivity increased slightly from about 1.3 at 35° C. to about 1.9 at −20° C., as shown in FIG. 4. The silicone rubber film remained selective for methane over hydrogen over the whole temperature range.

Example 3
Permeation Properties of Silicone Rubber Films with Pure Gases

Figure 5:
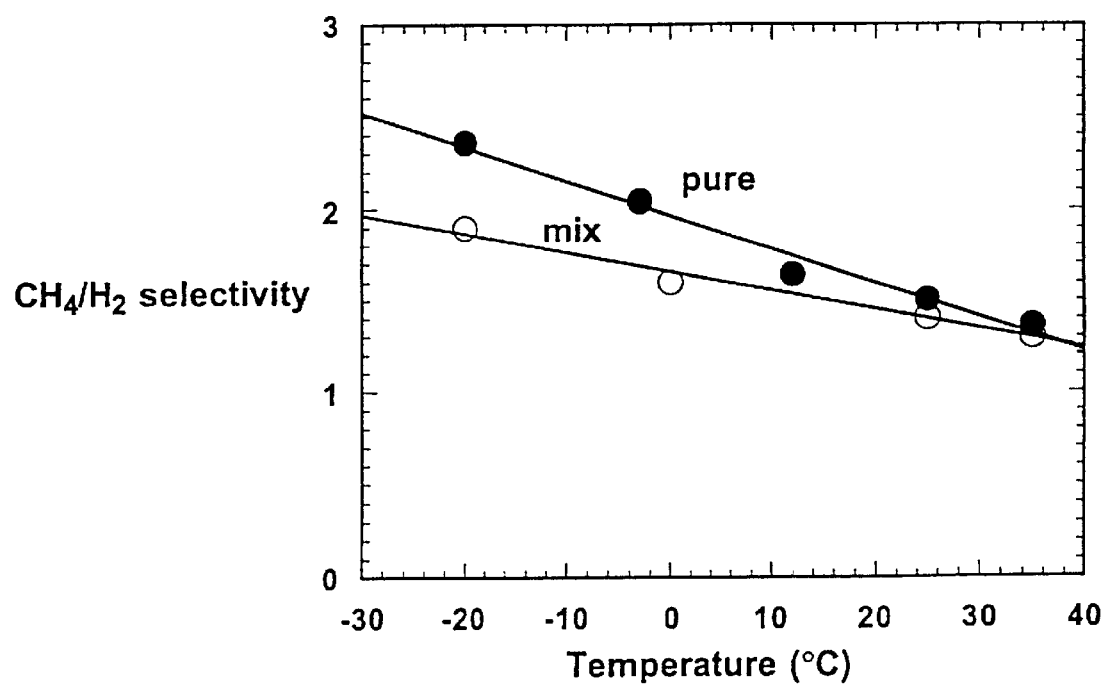
FIG. 5 is a graph comparing the effect of temperature on the methane/hydrogen selectivity of a silicone rubber film as measured with pure gases and with a binary gas mixture.

The experiment of Example 2 was repeated with pure hydrogen and pure methane. All experimental conditions were as in Example 2. The pure gas fluxes of the films were measured, and the methane/hydrogen selectivity was calculated. FIG. 5 compares the calculated pure gas methane/hydrogen selectivity to the mixed-gas methane/hydrogen selectivity obtained in Example 2.

Example 4
Permeation Properties of Silicone Rubber Films with a Multicomponent Gas Mixture The experiment of Example 2 was repeated with a gas mixture containing 50 vol % hydrogen, 19 vol % methane, 19 vol % ethane, 10 vol % propane, and 2 vol % n-butane. All experimental conditions were as in Example 2. The compositions of the residue and permeate were determined with a gas chromatograph equipped with a thermal conductivity detector, and permeabilities were calculated. The hydrocarbon/hydrogen selectivities were calculated from the ratios of the permeabilities.

Figure 6:
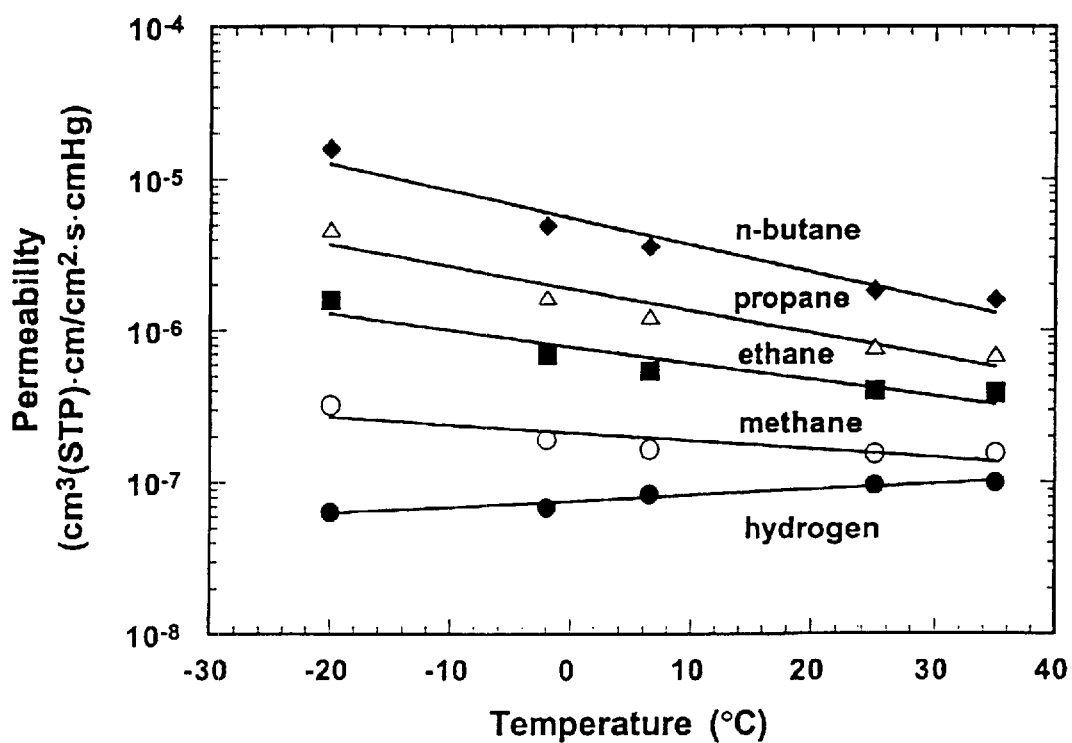
FIG. 6 is a graph showing the effect of temperature on the permeabilities of hydrogen, methane, ethane, propane and n-butane in a multicomponent gas mixture through a silicone rubber film.
Figure 7:
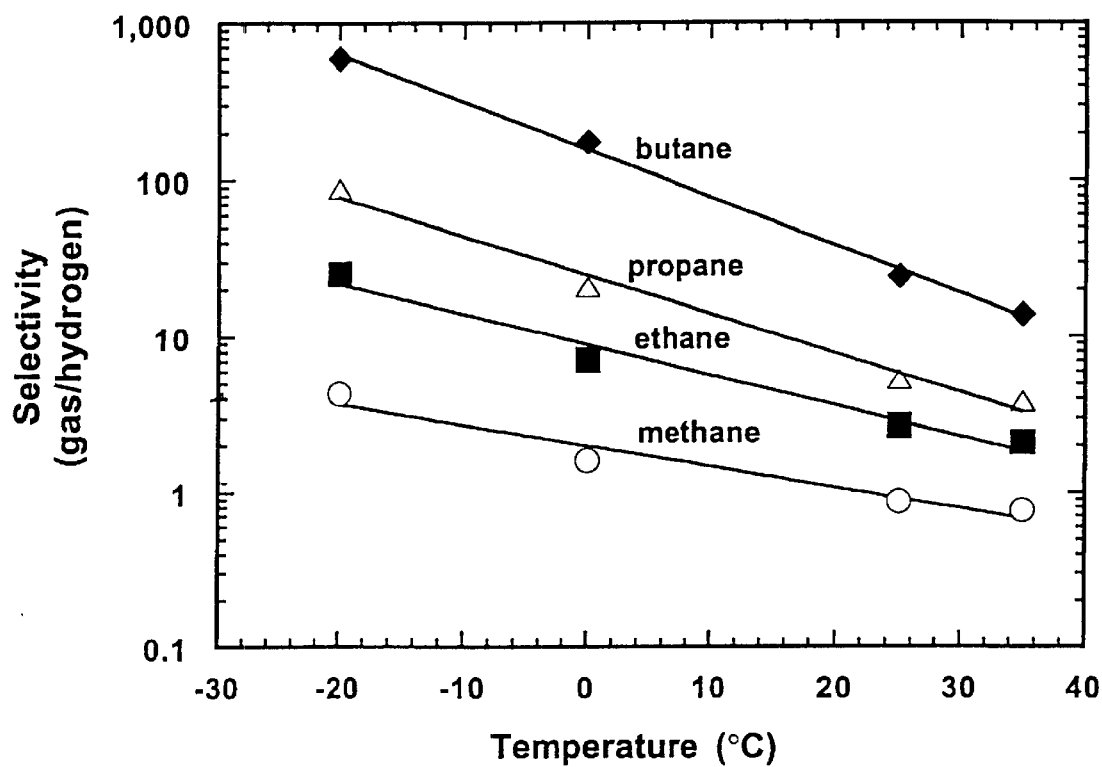
FIG. 7 is a graph showing the effect of temperature on the hydrocarbon/hydrogen selectivities of a silicone rubber film measured with a multicomponent gas mixture.

Permeability and selectivity results are shown in FIGS. 6 and 7, respectively, as a function of temperature. The permeabilities of both methane and hydrogen were higher at 35° C. in the multicomponent mixture than in the binary mixture. The permeability of hydrogen showed the same trend in the multicomponent mixture as in the binary mixture; that is, it decreased with decreasing temperature. The permeabilities of methane, ethane, propane and n-butane increased with decreasing feed temperature. For the most condensable gas, n-butane, the permeability increase was about 10-fold, from about 20,000 Barrer at 35° C. to about 200,000 Barrer at −20° C.

The methane permeability almost doubled, from about 1,500 Barrer to about 3,000 Barrer, as the temperature was lowered from 35° C. to −20° C. This is an unexpected result, and the opposite from the trend in the binary mixture case, where decreasing the temperature also decreased the methane permeability.

As a result, the mixed-gas hydrocarbon/hydrogen selectivities increased significantly as the feed temperature decreased, as shown in FIG. 7. The methane/hydrogen selectivity increased from about 1.4 at 35° C. to about 5 at −20° C.

Example 5

A computer calculation was performed with a modeling program, ChemCad III (ChemStations, Inc., Houston, Tex.), to illustrate the process of the invention as reflected in the embodiment of FIG. 2.

It was assumed that the gas to be treated was the hydrogen-rich off-gas from the phase separator/contactor section of a catalytic reformer. The gas was assumed to be treated in PSA unit 202 operating at 400 psia, and the process was modeled only from the PSA treatment onward. After leaving the PSA unit, the tail gas, stream 204, was assumed to be combined with the first membrane permeate stream, 209, compressed to 400 psia and cooled to −10° C. by a combination of air cooling, heat exchange against the membrane feed stream, and external chilling. Membrane separation steps were assumed to be carried out using silicone rubber membranes in membrane units 208 and 211.

The contactor section off-gas stream was assumed to have the following composition:

| | |
|---|---|
| Hydrogen | 92.5% |
| Methane | 1.8% |
| Ethane | 2.2% |
| Propane | 1.9% |
| Butanes | 0.8% |
| Pentanes | 0.1% |
| n-Hexane | 0.7% |

The results of the calculations are shown in Table 1. The stream numbers correspond to FIG. 2.

TABLE 1

| | Stream | | | | | | | | |
|---|---|---|---|---|---|---|---|---|---|
| | 201 | 203 | 204 + 209 | 206 | 207 | 209 | 210 | 212 | 213 |
| Mass flow (lb/h) | 22,199 | 8,106 | 31,364 | 9,857 | 21,507 | 14,263 | 7,243 | 4,234 | 3,010 |
| Temp. (° C.) | 25 | 25 | −3 | −10 | −10 | −15 | −15 | −17 | −17 |
| Pressure (psia) | 400 | 400 | 50 | 400 | 400 | 50 | 400 | 50 | 400 |
| Component (mol %) | | | | | | | | | |
| Hydrogen | 92.5 | 100.0 | 59.0 | 1.5 | 64.9 | 36.4 | 81.0 | 65.4 | 89.4 |
| Methane | 1.8 | — | 11.9 | 2.6 | 12.8 | 14.3 | 12.0 | 17.6 | 8.9 |
| Ethane | 2.2 | 0.0 | 15.9 | 21.7 | 15.3 | 32.3 | 5.7 | 13.5 | 1.5 |
| Propane | 1.9 | 0.0 | 9.1 | 37.3 | 6.2 | 14.9 | 1.3 | 3.2 | 0.2 |
| n-Butane | 0.8 | 0.0 | 2.3 | 18.2 | 0.7 | 1.9 | 0.1 | 0.2 | 0.0 |
| n-Pentane | 0.1 | 0.0 | 0.2 | 2.3 | — | 0.1 | — | | |
| n-Hexane | 0.7 | 0.0 | 1.6 | 16.3 | — | — | — | | |
| Component (lb/h): | | | | | | | | | |
| Hydrogen | 8,659 | 8,081 | 2,530 | 6.2 | 2,524 | 509.5 | 2,014 | 570.9 | 1,443 |
| Methane | 1,335 | 24.8 | 4,048 | 81.6 | 3,966 | 1,594 | 2,372 | 1,227 | 1,145 |
| Ethane | 3,059 | 0 | 10,154 | 1,295 | 8,859 | 6,740 | 2,118 | 1,764 | 353.9 |
| Propane | 3,874 | 0 | 8,511 | 3,255 | 5,255 | 4,573 | 682.0 | 618.2 | 64.2 |
| n-Butane | 2,150 | 0 | 2,904 | 2,101 | 802.3 | 750.0 | 51.2 | 48.3 | 2.7 |
| n-Pentane | 333.6 | 0 | 363.6 | 332.1 | 31.5 | 30.0 | 1.5 | 1.5 | 0 |
| n-Hexane | 2,789 | 0 | 2,855 | 2,786 | 68.8 | 65.4 | 3.4 | 3.2 | 0 |

— = less than 0.1
Membrane area = 1,000 m$^2$
Actual horsepower = 2,056 hp

The process of the invention recovers nearly 9,900 lb/h of LPG as stream 206. In prior art processes using only PSA to treat the net gas from the contactor section, this product would have been lost in the tail gas from the PSA unit.

The process produces about 4,000 lb/h of purge gas, of which only 600 lb/h is hydrogen. In prior art processes which purge the entire PSA tail gas stream, the stream would contain 17,000 lb/h of gas, of which 2,000 lb/h is hydrogen. Thus, the process is very advantageous in debottlenecking plants where production is limited by fuel gas generation.

The process also provides a recycle stream of 3,000 lb/h (stream 213) containing over 1,400 lb/h of hydrogen to return to the PSA unit for additional recovery.

Example 6

A computer calculation was performed as in Example 5, but this time assuming that the gas to be treated is a mixed waste gas stream of the following composition:

| | |
|---|---|
| Hydrogen | 82.0% |
| Nitrogen | 1.0% |
| Methane | 10.3% |
| Ethane | 3.0% |
| Propane | 1.3% |
| n-Butane | 0.6% |
| n-Pentane | 1.8% |
| Carbon Dioxide | 0.1% |

The gas stream was assumed to have a flow rate of about 33,000 lb/h, and to be at a temperature of 25° C. and a pressure of 400 psia. The process design of FIG. 2 was assumed to be used. The results of the calculations are shown in Table 2. The stream numbers correspond to FIG. 2.

TABLE 2

| | Stream | | | | | | | | |
|---|---|---|---|---|---|---|---|---|---|
| | 201 | 203 | 204 + 209 | 206 | 207 | 209 | 210 | 212 | 213 |
| Mass flow (lb/h) | 32,879 | 6,722 | 61,603 | 13,166 | 48,437 | 33,873 | 14,563 | 12,981 | 1,583 |
| Temp. (° C.) | 25 | 25 | −11 | −10 | −10 | −20 | −20 | −25 | −25 |
| Pressure (psia) | 400 | 400 | 50 | 400 | 400 | 50 | 400 | 50 | 400 |
| Component (mol %) | | | | | | | | | |
| Hydrogen | 82.0 | 100.0 | 34.3 | 0.9 | 37.2 | 20.1 | 55.6 | 52.1 | 76.4 |
| Nitrogen | 1.0 | 0.0 | 3.0 | 0.2 | 3.2 | 1.0 | 5.6 | 3.8 | 16.6 |
| Methane | 10.3 | — | 32.0 | 6.9 | 34.2 | 35.0 | 33.3 | 37.8 | 6.9 |
| Ethane | 3.0 | 0.0 | 20.7 | 27.4 | 20.1 | 34.4 | 4.8 | 5.6 | — |
| Propane | 1.3 | 0.0 | 5.3 | 21.4 | 3.9 | 7.1 | 0.3 | 0.4 | 0.0 |
| n-Butane | 0.6 | 0.0 | 1.3 | 10.7 | 0.5 | 0.9 | — | — | 0.0 |
| n-Pentane | 1.8 | 0.0 | 2.9 | 32.2 | 0.4 | 0.7 | — | — | 0.0 |
| Carbon Dioxide | 0.1 | 0.0 | 0.5 | 0.3 | 0.5 | 0.7 | 0.3 | 0.3 | — |
| Component (lb/h): | | | | | | | | | |

TABLE 2-continued

|  | Stream | | | | | | | | |
| --- | --- | --- | --- | --- | --- | --- | --- | --- | --- |
|  | 201 | 203 | 204 + 209 | 206 | 207 | 209 | 210 | 212 | 213 |
| Hydrogen | 8,049 | 6,705 | 2,325 | 5.1 | 2,320 | 649.1 | 1,671 | 1,338 | 333.1 |
| Nitrogen | 1,364 | 0 | 2,806 | 14.6 | 2,792 | 433.9 | 2,358 | 1,350 | 1,008 |
| Methane | 8,046 | 16.6 | 17,263 | 298.8 | 16,964 | 8,992 | 7,972 | 7,731 | 240.8 |
| Ethane | 4,393 | 0 | 20,967 | 2,241 | 18,726 | 16,585 | 2,141 | 2,140 | 0.5 |
| Propane | 2,791 | 0 | 7,835 | 2,569 | 5,266 | 5,043 | 223.0 | 223.0 | — |
| n-Butane | 1,698 | 0 | 2,539 | 1,687 | 851.6 | 840.9 | 10.7 | 10.7 | 0 |
| n-Pentane | 6,324 | 0 | 7,144 | 6,317 | 827.1 | 820.6 | 6.5 | 6.5 | 0 |
| Carbon Dioxide | 214.3 | 0 | 723.1 | 33.3 | 689.8 | 508.2 | 181.6 | 181.0 | 0.6 |

— = less than 0.1
Membrane area = 2,500 m$^2$
Actual horsepower = 3,155 hp

The process of the invention recovers 13,000 lb/h of LPG as stream 206, and recycles a stream of 1,600 lb/h (stream 213) containing over 300 lb/h of hydrogen to the PSA unit for further hydrogen recovery. The process produces 13,000 lb/h of purge gas, of which only 1,300 lb/h is hydrogen. In prior art processes which purge the entire PSA tail gas stream, the stream would contain nearly 28,000 lb/h of gas, of which 1,700 lb/h is hydrogen.

Example 7

A computer calculation was performed with a modeling program, ChemCad III (ChemStations, Inc., Houston, Tex.), to illustrate the process of the invention as reflected in the embodiment of FIG. 1, again for treating the overhead gas from the recontactor section of a catalytic reformer.

The net gas from the phase separator/contactor section was assumed to be a lighter mixture than the cases of Examples 5 and 6. Stream 101, after being combined with membrane residue recycle stream 110 (recycle not shown in FIG. 1), is assumed to be treated in PSA unit 102 operating at 400 psia, and the process was modeled only from the PSA treatment onward. After leaving the PSA unit, the tail gas, stream 104, was assumed to be recompressed to 400 psia and cooled to −10° C. by a combination of air cooling, heat exchange against the membrane feed stream, and external chilling. The membrane separation step was assumed to be carried out using a silicone rubber membrane in membrane unit 108. The contactor section off-gas stream was assumed to have the following composition:

| Hydrogen | 90.0% |
| --- | --- |
| Methane | 5.0% |
| Ethane | 3.0% |
| Propane | 1.0% |
| n-Butane | 0.5% |
| n-Pentane | 0.5% |

The results of the calculations are shown in Table 3. The stream numbers correspond to FIG. 1.

TABLE 3

|  | Stream | | | | | | |
| --- | --- | --- | --- | --- | --- | --- | --- |
|  | 101 | 103 | 104 | 106 | 107 | 109 | 110 |
| Mass flow (lb/h) | 21,404 | 7,387 | 15,424 | 2,567 | 12,856 | 11,450 | 1,406 |
| Temp. (° C.) | 25 | 25 | 20 | −10 | −10 | −15 | −15 |
| Pressure (psia) | 400 | 400 | 50 | 400 | 400 | 50 | 400 |
| Component (mol %) | | | | | | | |
| Hydrogen | 90.0 | 99.9 | 64.5 | 1.4 | 66.7 | 56.3 | 90.5 |
| Methane | 5.0 | 0.1 | 19.0 | 3.8 | 19.5 | 24.0 | 9.2 |
| Ethane | 3.0 | 0.0 | 9.9 | 14.1 | 9.8 | 14.0 | 0.3 |
| Propane | 1.0 | 0.0 | 3.3 | 17.5 | 2.8 | 4.0 | — |
| n-Butane | 0.5 | 0.0 | 1.6 | 23.9 | 0.8 | 1.3 | — |
| n-Pentane | 0.5 | 0.0 | 1.6 | 39.3 | 0.4 | 0.5 | — |
| Component (lb/h): | | | | | | | |
| Hydrogen | 8,422 | 7,344 | 1,836 | 1.3 | 1,835 | 1,077 | 757.7 |
| Methane | 3,724 | 43.4 | 4,294 | 28.2 | 4,266 | 3,653 | 613.3 |
| Ethane | 4,188 | 0 | 4,220 | 197.9 | 4,022 | 3,990 | 32.2 |
| Propane | 2,047 | 0 | 2,050 | 361.6 | 1,688 | 1,685 | 2.7 |
| n-Butane | 1,349 | 0 | 1,349 | 650.4 | 698.9 | 698.7 | 0.2 |
| n-Pentane | 1,675 | 0 | 1,675 | 1,328 | 346.7 | 346.7 | — |

— = less than 0.1
Membrane area = 1,000 m$^2$
Actual horsepower = 1,534 hp

The process of the invention recovers nearly 2,600 lb/h of LPG as stream 106. In prior art processes using only PSA to treat the net gas from the contactor section, this product would have been lost in the tail gas from the PSA unit.

The process produces 11,000 lb/h of purge gas, of which about 1,100 lb/h is hydrogen. In prior art processes which purge the entire PSA tail gas stream, the stream would contain 15,000 lb/h of gas, of which 1,800 lb/h is hydrogen. Thus, the process is very advantageous in debottlenecking plants where production is limited by fuel gas generation.

We claim:

1. A process for separating a stream comprising hydrogen, methane, ethane and a $C_{3+}$ hydrocarbon, comprising the following steps:
   (a) passing the stream through a pressure swing adsorption unit, thereby producing a hydrogen-enriched product stream and a tail gas stream;
   (b) compressing and cooling the tail gas stream;
   (c) passing at least a portion of the compressed, cooled tail gas stream across the feed side of a membrane separation unit containing a rubbery polymeric membrane, having a feed side and a permeate side and being selectively permeable to $C_1$–$C_6$ hydrocarbons over hydrogen, under conditions sufficient that the membrane exhibits an ethane/hydrogen selectivity of at least about 3.5;
   (d) withdrawing from the permeate side a permeate stream enriched in ethane and the $C_{3+}$ hydrocarbon compared with the tail gas stream;
   (e) withdrawing from the feed side a residue stream enriched in hydrogen compared with the tail gas stream.

2. The process of claim 1, further comprising recirculating at least a portion of the residue stream to step (a).

3. The process of claim 1, further comprising recirculating at least a portion of the permeate stream to step (b).

4. The process of claim 1, wherein step (b) results in the production of a condensed $C_{3+}$ hydrocarbons stream.

5. The process of claim 1, wherein the permeate stream is also enriched in methane compared with the tail gas stream.

6. The process of claim 1, wherein the rubbery polymeric membrane comprises silicone rubber.

7. The process of claim 1, wherein the selectivity exhibited in step (c) is at least about 4.

8. The process of claim 1, wherein the selectivity exhibited in step (c) is at least about 5.

9. The process of claim 1, wherein the stream comprises an effluent stream from an operation chosen from the group consisting of catalytic reforming, steam reforming, hydrocracking, hydrotreating, hydrogenation, dehydrogenation, hydrodealkylation and isomerization.

10. The process of claim 1, wherein the stream comprises an effluent stream from a catalytic reformer.

11. The process of claim 1, wherein the stream further comprises at least a minor amount of $C_{5-6}$ hydrocarbons.

12. A process for separating a stream comprising hydrogen, methane, ethane and a $C_{3+}$ hydrocarbon into at least three streams of different composition, comprising the following steps:
   (a) passing the stream through a pressure swing adsorption unit, thereby producing a hydrogen-enriched product stream and a tail gas stream;
   (b) compressing and cooling the tail gas stream, thereby producing a condensed $C_{3+}$ hydrocarbon stream and an uncondensed stream;
   (c) passing the uncondensed stream across the first feed side of a first polymeric membrane having a first feed side and a first permeate side, and being selectively permeable to $C_{3+}$ hydrocarbons over hydrogen;
   (d) withdrawing from the first permeate side a first permeate stream enriched in $C_{3+}$ hydrocarbons compared with the uncondensed stream;
   (e) withdrawing from the first feed side a first residue stream enriched in hydrogen compared with the uncondensed stream;
   (f) passing the first residue stream across the second feed side of a second rubbery polymeric membrane having a second feed side and a second permeate side and being selectively permeable to $C_1$–$C_6$ hydrocarbons over hydrogen, under conditions sufficient that the membrane exhibits an ethane/hydrogen selectivity of at least about 3.5;
   (g) withdrawing from the second permeate side a second permeate stream enriched in ethane and the $C_{3+}$ hydrocarbon compared with the first residue stream;
   (h) withdrawing from the second feed side a second residue stream enriched in hydrogen compared with the first residue stream.

13. The process of claim 12, further comprising recirculating at least a portion of the second residue stream to step (a).

14. The process of claim 12, further comprising recirculating at least a portion of the first permeate stream to step (b).

15. The process of claim 12, wherein the second permeate stream is also enriched in methane compared with the first residue stream.

16. The process of claim 12, wherein the selectivity exhibited in step (f) is at least about 4.

17. The process of claim 12, wherein the selectivity exhibited in step (f) is at least about 5.

18. The process of claim 12, wherein the second residue stream is recirculated to step (a), the first permeate stream is recirculated to step (b), and the second permeate stream is used as fuel gas.

19. The process of claim 1, wherein the stream further comprises at least a minor amount of $C_{5-6}$ hydrocarbons.

20. A hydrocarbon conversion process, comprising the following steps:
   (a) reacting a hydrocarbon feedstock in a hydrocarbon conversion reactor;
   (b) withdrawing an effluent stream comprising hydrogen and hydrocarbons from the reactor;
   (c) separating from the effluent stream a liquid phase and a vapor phase, the vapor phase comprising hydrogen, methane, ethane and a $C_{3+}$ hydrocarbon;
   (d) passing at least a portion of the vapor phase through a pressure swing adsorption unit, thereby producing a hydrogen-enriched product stream and a tail gas stream;
   (e) compressing and then cooling the tail gas stream;
   (f) passing at least a portion of the compressed, cooled tail gas stream as a feed stream across the feed side of a membrane separation unit containing a rubbery polymeric membrane having a feed side and a permeate side, and being selectively permeable to $C_1$–$C_6$ hydrocarbons over hydrogen, under conditions sufficient that the membrane exhibits an ethane/hydrogen selectivity of at least about 3.5;
   (g) withdrawing from the permeate side a permeate stream enriched in ethane and the $C_{3+}$ hydrocarbon compared with the tail gas stream;
   (h) withdrawing from the feed side a residue stream enriched in hydrogen compared with the tail gas stream.

21. The process of claim 20, further comprising recirculating at least a portion of the residue stream to step (d).

22. The process of claim 20, further comprising recirculating at least a portion of the permeate stream to step (e).

23. The process of claim 20, wherein step (e) results in the production of a condensed $C_{3+}$ hydrocarbons stream.

24. The process of claim 20, wherein the hydrocarbon conversion reactor carries out a reaction chosen from the group consisting of catalytic reforming, steam reforming, hydrocracking, hydrotreating, hydrogenation, dehydrogenation, hydrodealkylation and isomerization.

25. The process of claim 20, further comprising dividing the vapor phase into at least two vapor streams, a first vapor stream that is recirculated to step (a) and a second vapor stream that forms the portion passed to the pressure swing adsorption unit in step (d).

26. The process of claim 20, wherein the permeate stream is also enriched in methane compared with the tail gas stream.

27. The process of claim 20, wherein the selectivity exhibited in step (f) is at least about 4.

28. The process of claim 20, wherein the selectivity exhibited in step (f) is at least about 5.

29. A process for separating a stream comprising hydrogen, methane, ethane and a $C_{3+}$ hydrocarbon, comprising the following steps:
(a) passing the stream through a pressure swing adsorption unit, thereby producing a hydrogen-enriched product stream and a tail gas stream;
(b) compressing and cooling the tail gas stream;
(c) passing at least a portion of the compressed, cooled tail gas stream across the feed side of a membrane separation unit containing a rubbery polymeric membrane, having a feed side and a permeate side and being selectively permeable to $C_1$–$C_6$ hydrocarbons over hydrogen under conditions sufficient that the membrane exhibits a selectivity in favor of ethane over hydrogen;
(d) withdrawing from the permeate side a permeate stream enriched in ethane and the $C_{3+}$ hydrocarbon compared with the tail gas stream;
(e) withdrawing from the feed side a residue stream enriched in hydrogen compared with the tail gas stream.

30. The process of claim 29, further comprising recirculating at least a portion of the residue stream to step (a).

31. The process of claim 29, further comprising recirculating at least a portion of the permeate stream to step (b).

32. The process of claim 29, wherein step (b) results in the production of a condensed $C_{3+}$ hydrocarbons stream.

33. A hydrocarbon conversion process, comprising the following steps:
(a) reacting a hydrocarbon feedstock in a hydrocarbon conversion reactor;
(b) withdrawing an effluent stream comprising hydrogen and hydrocarbons from the reactor;
(c) separating from the effluent stream a liquid phase and a vapor phase, the vapor phase comprising hydrogen, methane, ethane and a $C_{3+}$ hydrocarbon;
(d) passing at least a portion of the vapor phase through a pressure swing adsorption unit, thereby producing a hydrogen-enriched product stream and a tail gas stream;
(e) compressing and then cooling the tail gas stream;
(f) passing at least a portion of the compressed, cooled tail gas stream as a feed stream across the feed side of a membrane separation unit containing a rubbery polymeric membrane having a feed side and a permeate side, and being selectively permeable to $C_1$–$C_6$ hydrocarbons over hydrogen under conditions sufficient that the membrane exhibits a selectivity in favor of ethane over hydrogen;
(g) withdrawing from the permeate side a permeate stream enriched in ethane and the $C_{3+}$ hydrocarbon compared with the tail gas stream;
(h) withdrawing from the feed side a residue stream enriched in hydrogen compared with the tail gas stream.

34. The process of claim 33, further comprising recirculating at least a portion of the residue stream to step (d).

35. The process of claim 33, further comprising recirculating at least a portion of the permeate stream to step (e).

36. The process of claim 33, wherein step (e) results in the production of a condensed $C_{3+}$ hydrocarbons stream.

37. The process of claim 33, wherein the hydrocarbon conversion reactor carries out a reaction chosen from the group consisting of catalytic reforming, steam reforming, hydrocracking, hydrotreating, hydrogenation, dehydrogenation, hydrodealkylation and isomerization.

38. The process of claim 33, further comprising dividing the vapor phase into at least two vapor streams, a first vapor stream that is recirculated to step (a) and a second vapor stream that forms the portion passed to the pressure swing adsorption unit in step (d).

* * * * *